United States Patent
Nyström

(10) Patent No.: US 12,436,181 B2
(45) Date of Patent: Oct. 7, 2025

(54) ELECTRIC INSULATION MONITORING ARRANGEMENT

(71) Applicant: VOLVO TRUCK CORPORATION, Gothenburg (SE)

(72) Inventor: Mats Nyström, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 497 days.

(21) Appl. No.: 17/350,347

(22) Filed: Jun. 17, 2021

(65) Prior Publication Data

US 2021/0396800 A1      Dec. 23, 2021

(30) Foreign Application Priority Data

Jun. 23, 2020   (EP) ..................................... 20181727

(51) Int. Cl.
*G01R 31/12*     (2020.01)
*G01R 31/00*     (2006.01)

(52) U.S. Cl.
CPC ....... *G01R 31/1272* (2013.01); *G01R 31/007* (2013.01)

(58) Field of Classification Search
CPC .............. G01R 31/1272; G01R 31/007; G01R 27/025; G01R 35/00; G01R 31/52; G01R 31/1227
See application file for complete search history.

(56) References Cited

U.S. PATENT DOCUMENTS

2007/0127170 A1\* 6/2007 Park .................... H02H 7/1227
                                                             361/18
2008/0309351 A1\* 12/2008 Stewart .............. G01R 31/1272
                                                             324/551

(Continued)

FOREIGN PATENT DOCUMENTS

EP          2331977 A1    6/2011
WO       2010036153 A1    4/2010

*Primary Examiner* — Hitesh Patel
*Assistant Examiner* — Wenyuan Yang
(74) *Attorney, Agent, or Firm* — Venable LLP; Jeffri A. Kaminski

(57) ABSTRACT

An electric insulation monitoring arrangement (10) for monitoring electric insulation in an electric system (2), in particular of a vehicle, comprising a first conductor (11) and a second conductor (12), the electric insulation monitoring arrangement comprising:

an insulation monitoring device (15) comprising a primary measuring unit (13) configured to monitor a first voltage ($V_1$) between the first conductor and ground, and a second voltage (V2) between the second conductor and ground, the insulation monitoring device being configured to determine an electric insulation of the electric system based on measurement data from the primary measuring unit, at least one secondary measuring unit (14) configured to monitor the first voltage and the second voltage with respect to ground, wherein the at least one secondary measuring unit is provided separately from the insulation monitoring device.

The insulation monitoring device is configured to use measurement data relating to the first voltage and the second voltage received from the at least one secondary measuring unit to verify the determined electric insulation.

9 Claims, 2 Drawing Sheets

(56) References Cited

U.S. PATENT DOCUMENTS

| | | | | |
|---|---|---|---|---|
| 2010/0308841 | A1* | 12/2010 | Karrer | G01R 27/18 |
| | | | | 324/123 R |
| 2011/0006781 | A1* | 1/2011 | Kawamura | G01R 31/52 |
| | | | | 324/551 |
| 2014/0103936 | A1* | 4/2014 | Lasson | G01R 31/006 |
| | | | | 324/503 |
| 2014/0159908 | A1* | 6/2014 | Hong | G01R 31/52 |
| | | | | 702/58 |
| 2015/0204937 | A1* | 7/2015 | Lehr | G01R 31/52 |
| | | | | 324/551 |
| 2015/0253360 | A1* | 9/2015 | Wendt | H05B 47/18 |
| | | | | 307/18 |
| 2015/0285850 | A1* | 10/2015 | Liu | G01R 27/025 |
| | | | | 324/551 |
| 2017/0297447 | A1* | 10/2017 | Tzivanopoulos | B60L 3/0069 |
| 2018/0003662 | A1* | 1/2018 | Fuchs | G01B 21/047 |
| 2018/0147940 | A1* | 5/2018 | Brandmeier | B60L 3/04 |
| 2019/0001821 | A1* | 1/2019 | Gustafsson | G01R 27/02 |
| 2022/0057443 | A1* | 2/2022 | Trunk | G01R 31/007 |
| 2022/0413033 | A1* | 12/2022 | Jang | G01R 31/1272 |

* cited by examiner

ELECTRIC INSULATION MONITORING ARRANGEMENT

TECHNICAL FIELD

The invention relates to an electric insulation monitoring arrangement for monitoring electric insulation. The invention further relates to a method for monitoring electric insulation in an electric system, a computer program, a computer readable medium, and a vehicle.

The invention can be applied in electrically operated heavy-duty vehicles, such as trucks, buses and construction equipment. Although the invention will be described with respect to a fully electrified truck, the invention is not restricted to this particular vehicle, but may also be used in other vehicles such as buses, trailers, wheel loaders, excavators, passenger cars, etc. It may also be applied in electric systems of e.g. electrically operated vessels and in various working machines. It is applicable in fully electrically operated vehicles as well as in hybrid vehicles, comprising also a combustion engine.

BACKGROUND

Electric insulation monitoring, also referred to as electric isolation monitoring, is important in electrically operated vehicles provided with electric systems in which hazardous voltage levels are used. By monitoring the electric insulation resistance, it is ensured that the vehicle is safe for passengers, and that it is safe for a technician to for example perform tasks on-board the vehicle, without risking electric shock. An electric insulation monitoring device may be used for this purpose, which is connected between the chassis of the vehicle, functioning as ground, and a conductor of the electric system, for example one of the DC lines in a direct current (DC) system. The insulation monitoring device applies a test load or a test signal between the conductor and the chassis, and the voltage response is detected and evaluated by a measuring unit. If the resistance between the conductor and the chassis, i.e. the insulation resistance, drops below a certain level, the insulation monitoring device may be configured to emit an alarm signal and/or to disconnect a power supply of the electric system.

A reliable measurement of the voltage response is crucial for safety. Insulation monitoring devices as described above are therefore typically provided on-board the vehicle and used for continuously monitoring the insulation resistance, ensuring that the vehicle is safe for passengers.

Safety requirements for on-board rechargeable electric energy storage systems of electrically operated vehicles are specified in ISO standard 6469-1. To comply with the safety requirements during service of the vehicle, it is, in addition to the on-board insulation monitoring device, typically required to connect an external, independently operated insulation monitoring device to the electric system, which external device performs an independent determination of the insulation resistance. Such an external device needs to be calibrated to ensure that the voltage response is reliably monitored. The connection of an external insulation monitoring device may however be time consuming.

SUMMARY

A primary objective of the invention is to provide an in at least some aspect improved electric insulation monitoring arrangement for an electric system, and in particular for an electric propulsion system of an electrically operated vehicle. Another objective of the invention is to improve the robustness of insulation monitoring in electrically operated vehicles using hazardous voltages, such that service time may be reduced while increasing product safety.

According to a first aspect of the invention, at least the primary objective is achieved by an electric insulation monitoring arrangement for monitoring electric insulation in an electric system comprising a first conductor and a second conductor according to claim 1. The electric insulation monitoring arrangement comprises:

an insulation monitoring device comprising a primary measuring unit configured to monitor a first voltage between the first conductor and ground, and a second voltage between the second conductor and ground, the insulation monitoring device being configured to determine an electric insulation of the electric system based on measurement data relating to the first voltage and the second voltage from the primary measuring unit.

The electric insulation monitoring arrangement further comprises at least one secondary measuring unit configured to monitor the first voltage and the second voltage with respect to ground, wherein the at least one secondary measuring unit is provided separately from the insulation monitoring device. The insulation monitoring device is further configured to use measurement data relating to the first voltage and the second voltage received from the at least one secondary measuring unit to verify the determined electric insulation.

According to a second aspect of the invention, a method for monitoring electric insulation in an electric system comprising a first conductor and a second conductor is provided. The method comprises:

applying a test load or a test signal between at least one of the first conductor and the second conductor and ground;

while applying the test load or test signal, using a primary measuring unit, monitoring a first voltage between the first conductor and ground, and a second voltage between the second conductor and ground, based on measurement data relating to the first voltage and the second voltage from the primary measuring unit, determining an electric insulation of the electric system, verifying the determined electric insulation based on measurement data relating to the first voltage and the second voltage received from at least one secondary measuring unit provided separately from the primary measuring unit.

By using a secondary measuring unit provided separately from the insulation monitoring device, and using the measurement from this secondary measuring unit to verify the determined electric insulation, the robustness of the insulation monitoring is improved. This also improves the safety and reduces service time, since no additional measurement equipment need to be provided for calibration and/or verification/validation of the electric insulation as determined using the electric insulation monitoring arrangement. When the electric insulation monitoring arrangement and the method are applied to an electric system of a vehicle, the secondary measuring unit and the use of measurement data independently collected by the secondary measuring unit thus eliminate the need for connection of any external additional insulation monitoring devices during service of the vehicle. In particular, the need to connect an external insulation monitoring device to verify the insulation resistance as determined by an on-board insulation monitoring device is eliminated.

The electric system may be an electric system of a vehicle, in which case a chassis of the vehicle may typically function as the ground for electric insulation monitoring purposes.

By determining an electric insulation of the electric system is herein to be understood determining an electric insulation resistance of the electric system. The determined electric insulation corresponds to the electric insulation resistance between the first conductor and ground, and/or the second conductor and ground, respectively.

Since the secondary measuring unit as well as the primary measuring unit monitors the first voltage and the second voltage with respect to the ground reference, measurements of the electric insulation resistance can be performed also when there is no low-ohmic voltage source present between the conductors, such as when a power supply of the electric system, for example a battery, is switched off. The proposed electric insulation monitoring arrangement may however also be used for monitoring the electric insulation between live conductors and ground, i.e. when the first and second conductors are used for electric power supply.

It is to be noted that the secondary measuring unit does not need to include any means for determining the electric insulation from the collected measurement data. Instead, the secondary measurement unit is configured for communicating the measurement data to the insulation monitoring device, in which the measurement data are used for verifying the determined insulation resistance. The secondary measurement unit may be permanently connected to the electric system, but it may also be connectable when the need arises for an increased safety level, such as prior to service of a vehicle in which the electric system is provided.

The electric insulation monitoring arrangement and method are particularly applicable to DC conductors in DC electric systems, but may in principle also be applied in alternating current (AC) electric systems. The first and second conductors may e.g. be the positive and negative conductors, respectively, of a DC electric system.

The measuring units may be physically separate, i.e. wherein a circuit board of the primary measuring unit is physically separated from a circuit board of the secondary measuring unit. Propagation of errors from one of the circuit boards to the other is thereby prevented.

Further advantages and advantageous features of the invention are disclosed in the following description and in the dependent claims.

Optionally, the at least one secondary measuring unit is controlled independently from the insulation monitoring device. The insulation monitoring device, including the primary measuring unit, may comprise a control unit adapted to apply an insulation test load or test signal, to control the primary measuring unit, and to determine the electric insulation resistance based on the measurement data collected by the primary measuring unit.

Optionally, the at least one secondary measuring unit is configured to monitor the first voltage and the second voltage at a different position than the primary measuring unit. If the primary measuring unit is connected to the first and second conductors at primary measuring positions, the secondary measuring unit may be connected to the first and second conductors at secondary measuring positions, which are physically separated from the primary measuring positions by a distance which is sufficient to ensure complete independence, e.g. by a distance of at least 10 centimetres (cm) as measured along the conductors. The risk that the measurements using the primary and the secondary measuring units interfere is thereby reduced.

Optionally, the electric insulation monitoring arrangement further comprises a communication interface for communicating measurement data from the at least one secondary measuring unit to the insulation monitoring device. The communication interface may be configured for hard-wired communication of data, or for wireless communication.

Optionally, the electric insulation monitoring arrangement comprises at least two separate secondary measuring units, wherein the insulation monitoring device is configured to use measurement data relating to the first voltage and the second voltage received from both of the at least two secondary measuring units for verifying the determined electric insulation. This improves the accuracy of the insulation monitoring arrangement and minimizes the risk of erroneous false alarms, since it is very unlikely that two independent secondary measuring units will show the same erroneous voltage reading. All of the at least two secondary measuring units may be configured to measure both the first and the second voltage. It is also possible to provide a first secondary measuring unit configured to measure the first voltage, and a second secondary measuring unit configured to measure the second voltage. In this case, measurement data from the first secondary measuring unit are used to verify the determined electric insulation between the first conductor and ground, and measurement data from the second secondary measuring unit are used to verify the determined electric insulation between the second conductor and ground.

Optionally, the insulation monitoring device comprises means for applying an insulation test load or test signal between at least one of the first and second conductors and ground. The insulation monitoring device may typically comprise means for applying an insulation test load between on one hand the first conductor and ground, and on the other hand the second conductor and ground. Typically, the insulation monitoring device may be configured to apply the insulation test load sequentially between the first conductor and ground, and the second conductor and ground. In some cases, the test load may be applied simultaneously between each of the conductors and ground.

Optionally, the insulation monitoring device is configured to determine that an electric insulation fault is present given that at least one insulation fault criterion is fulfilled. If no insulation fault criterion is fulfilled, the electric system, and e.g. a vehicle in which the electric system is provided, may be indicated as safe.

Optionally, the insulation monitoring device is configured to, in response to the determination of the electric insulation fault, generate a signal and/or disconnect a power supply of the electric system. The signal may be an audio and/or visual warning signal and the signal may also trigger an error message. The signal may also trigger a disconnection of the power supply to the electric system.

Optionally, the at least one insulation fault criterion includes a criterion which is considered fulfilled if the first voltage and/or the second voltage as measured by the at least one secondary measuring unit differ/s from the first voltage and/or the second voltage as measured by the primary measuring unit by more than a predetermined threshold value.

Optionally, the at least one insulation fault criterion includes a criterion which is considered fulfilled if measurement data from at least one of the primary measuring unit and the at least one secondary measuring unit indicate a calculated insulation resistance below a predetermined threshold value. The threshold value may be set higher than required by regulations to provide some safety margin. For example, according to ISO 6469-3, an insulation resistance of 100 Ω/V is required, i.e. an insulation resistance of at least 75 kΩ for a 750 V electric system. In this case, a threshold value of 300 kΩ may be set as a threshold value to provide a safety margin.

According to a third aspect of the invention, a computer program is provided comprising program code means for causing the insulation monitoring device of the electric insulation monitoring arrangement according to the first aspect to perform the method according to the second aspect when said computer program is run on a control unit of the insulation monitoring device.

According to a fourth aspect of the invention, a computer readable medium is provided carrying a computer program comprising program means for causing the insulation monitoring device of the electric insulation monitoring arrangement according to the first aspect to perform the method according to the second aspect when said computer program is run on a control unit of the insulation monitoring device.

According to a fifth aspect of the invention, a vehicle is provided comprising an electric system and at least one electric insulation monitoring arrangement for monitoring electric insulation in the electric system according to the first aspect.

BRIEF DESCRIPTION OF THE DRAWINGS

With reference to the appended drawings, below follows a more detailed description of embodiments of the invention cited as examples.

In the drawings.

The drawings are schematic and not necessarily drawn to scale.

DETAILED DESCRIPTION OF EXAMPLE EMBODIMENTS OF THE INVENTION

In the present detailed description, embodiments of the method according to the present invention are mainly described with reference to an all-electric bus, comprising a propulsion system in the form of battery powered electric motors. However, it should be noted that various embodiments of the described invention are equally applicable for a wide range of hybrid and electric vehicles. The invention is also applicable in electric systems in e.g. construction equipment, vessels, etc.

Figure 1:
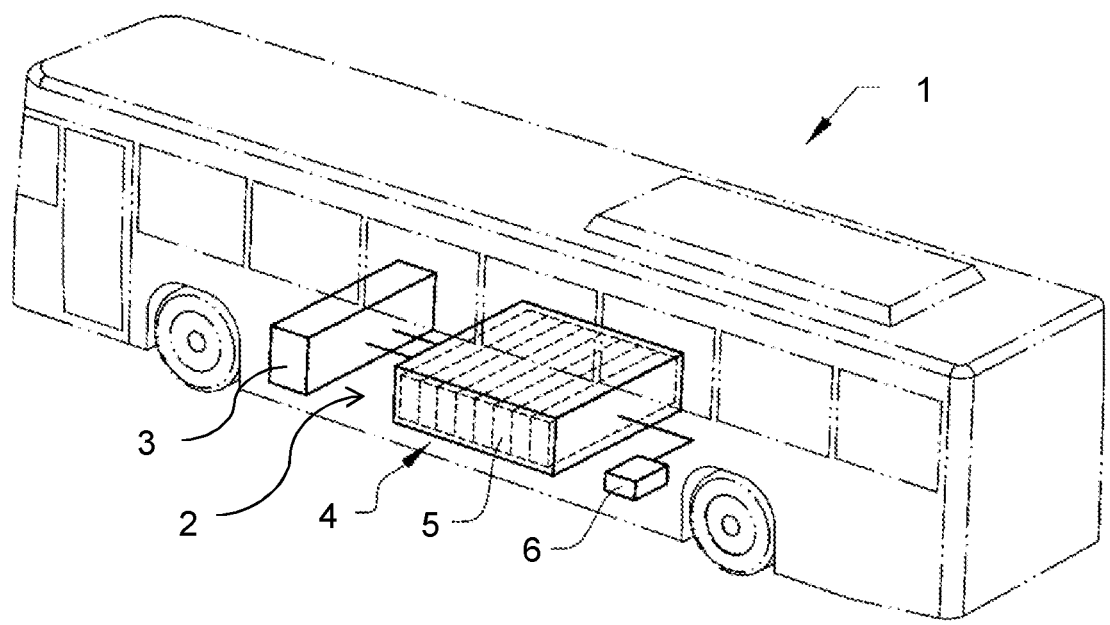
FIG. 1 schematically shows a vehicle in which an electric insulation monitoring arrangement according to the invention may be provided, FIG. 2 schematically shows an example embodiment of an electric insulation monitoring arrangement according to the invention.

FIG. 1 shows a simplified perspective view of an all-electric vehicle in the form of a bus 1. The bus 1 comprises an electric system 2, which herein comprises an electric drive unit 3 for propulsion of the bus. Of course, other loads may be provided in addition to or instead of the electric drive unit 3, for example auxiliary systems requiring electric power, and/or an on-board charger, and/or a power take-off. The electric drive unit 3 may comprise a traction motor, power electronics, and controls associated therewith (not shown).

The bus 1 further carries an electric energy storage system (ESS) 4 comprising a plurality of battery modules 5, wherein each battery module 2 may in turn comprise a plurality of battery cells (not shown). The battery cells may be connected in series to provide an output DC voltage having a desired voltage level. Suitably, the battery cells are of lithium-ion type, but other types may also be used. The number of battery cells per battery module 5 may be in the range of 50 to 500 cells. It is to be noted that the ESS 4 may also include a plurality of battery packs, each comprising one or more battery modules 5. An ESS control unit 6 is provided for controlling operation of the ESS 4.

Figure 2:
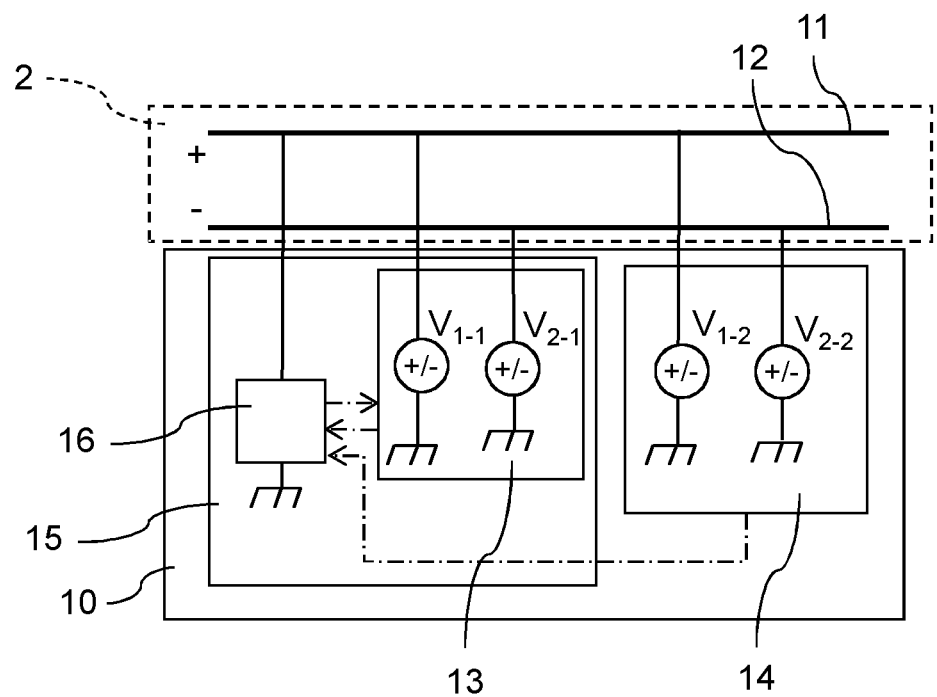

FIG. 2 schematically shows an electric system 2 of a vehicle, such as the electric system 2 of the bus 1 illustrated in FIG. 1. The electric system 2 comprises a first conductor 11 in the form of a positive DC line, and a second conductor 12 in the form of a negative DC line. An insulation monitoring arrangement 10 according to an embodiment of the invention is connected to the electric system 2 and configured for monitoring the electric insulation resistance of the electric system 2, i.e. between each of the conductors 11, 12 and a ground reference. In this case, a chassis of the vehicle 1 serves as the ground reference.

The electric insulation monitoring arrangement 10 comprises an insulation monitoring device 15 for monitoring the electric insulation resistance between the first conductor 11 and ground, and between the second conductor 12 and ground, respectively. For this purpose, the insulation monitoring device 15 comprises a primary measuring unit 13 configured to monitor a first voltage $V_1$ between the first conductor 11 and ground by continuously or periodically measuring a set of voltage values $V_{1-1}$, and a second voltage $V_2$ between the second conductor 12 and ground by continuously or periodically measuring a set of voltage values $V_{2-1}$. The insulation monitoring device 15 further comprises a control unit 16 configured to control the voltage measurements performed by the primary measuring unit 13. The control unit 16 is further configured to determine the electric insulation resistance of the electric system 2 based on the measurement data $V_{1-1}, V_{2-1}$ 10 relating to the first voltage $V_1$ and the second voltage $V_2$, respectively, received from the primary measuring unit 13.

The electric insulation monitoring arrangement 10 further comprises a secondary measuring unit 14, provided separately from the insulation monitoring device 15 and consequently also separately from the primary measuring unit 13. For example, but not necessarily, the secondary measuring unit 14 and the insulation monitoring device 15 may be located in separate metal housings, such as aluminium housings. The secondary measuring unit 14 is configured to monitor the first voltage $V_1$ and the second voltage $V_2$ by, over time, measuring a set of voltage values $V_{1-2}$ between the first conductor 11 and ground, and a set of voltage values $V_{2-2}$ between the second conductor 12 and ground, respectively.

The measurements performed by the secondary measuring unit 14 are controlled independently from those performed by the primary measuring unit 13, such as by a separate control unit (not shown). Measurement data $V_{1-2}, V_{2-2}$ relating to the first voltage $V_1$ and the second voltage $V_2$, respectively, as measured by the secondary measuring unit 14 are however communicated to the insulation monitoring device 15, such as to the control unit 16 thereof. The insulation monitoring device 15 is configured to use the measurement data $V_{1-2}, V_{2-2}$ received from the secondary measuring unit 14 to verify the determined electric insulation resistance, which was determined based on the measurement data $V_{1-1}, V_{2-1}$ from the primary measuring unit 13.

Means for applying an insulation test load or test signal between each one of the first and the second conductors 11, 12 and ground, most commonly sequentially but in some cases simultaneously, are included in the insulation monitoring device 15. The insulation monitoring device 15 may thus be used both for controlling the test loading of the electric system 10 and for controlling the measurements made by the primary measuring unit 13.

Figure 3:
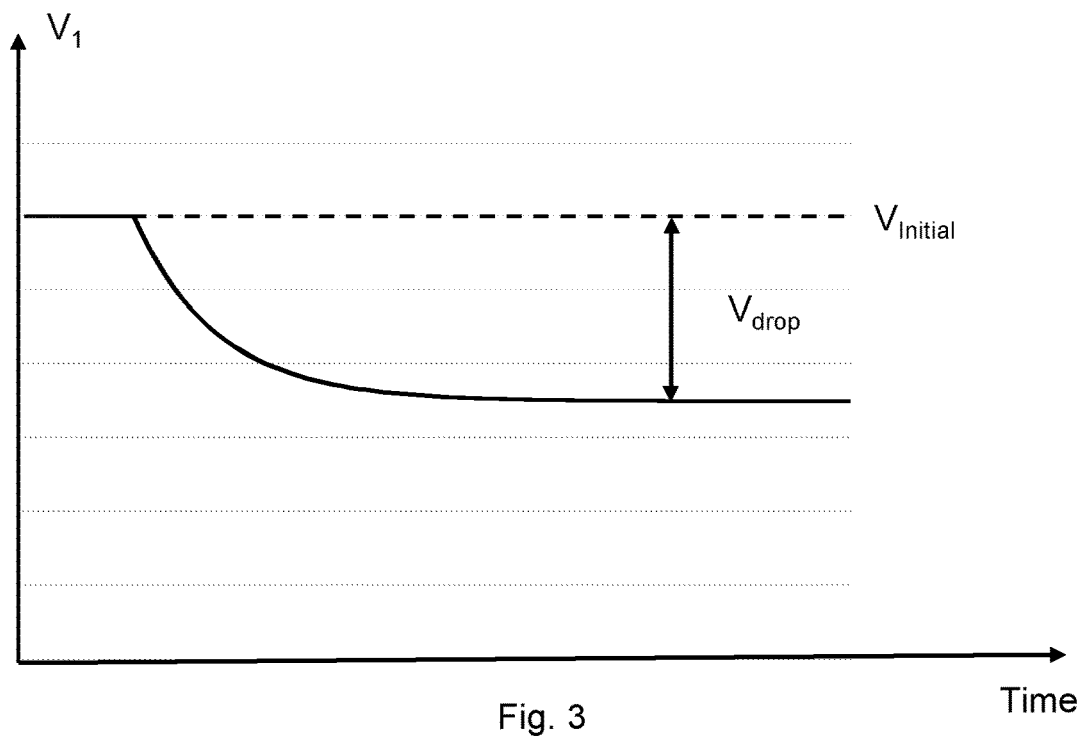
FIG. 3 is a diagram illustrating a voltage measurement.

Typically, an initial test voltage $V_{initial}$ is applied between one of the conductors 11, 12 and ground, and the voltage response is measured over time by means of the primary measuring unit 13. This is illustrated in FIG. 3, in which the voltage $V_1$ between the first conductor 11 and ground is monitored as a function of time. Independently from the measurement by the primary measuring unit 13, measurements are performed by the secondary measuring unit 14 and communicated to the insulation monitoring device 15. If a predetermined insulation fault criterion is fulfilled, e.g. if one of the measuring units 13, 14 measure a voltage drop $V_{drop}$ that corresponds to a calculated insulation resistance below a predetermined threshold value, corresponding to a safe electric insulation level, the insulation monitoring device 15 may determine that there is an insulation fault between the loaded conductor and ground. In response thereto, it may generate a signal for providing a warning and/or for cutting the power to the electric system 2.

A plurality of insulation fault criteria may be defined, wherein it is determined that an insulation fault exists if at least one of those criteria are fulfilled. Another exemplary insulation fault criterion may be considered fulfilled if the first voltage $V_1$ and/or the second voltage $V_2$, as measured by the secondary measuring unit 14, differ/s from the first voltage $V_1$ and/or the second voltage $V_2$, as measured by the primary measuring unit 13, respectively, by more than a predetermined threshold value.

Figure 4:
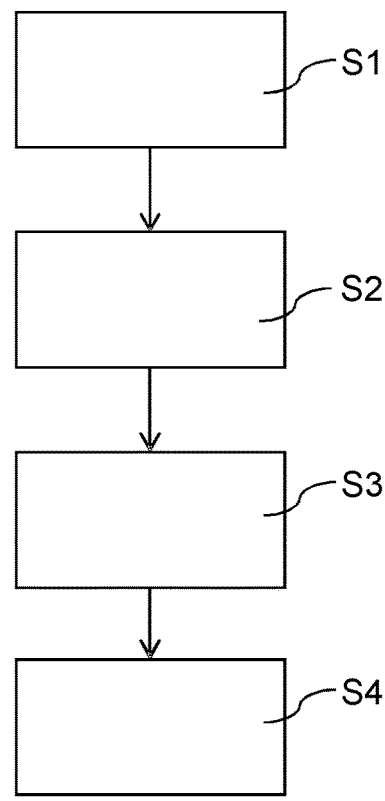
FIG. 4 is a flow-chart illustrating a method according to an embodiment of the invention.

A method for monitoring electric insulation in an electric system 2 comprising a first conductor 11 and a second conductor 12, such as the electric system 2 shown in FIG. 2, is illustrated in the flow chart of FIG. 4. The method comprises the following steps:

S1: Applying a test load or test signal between at least one of the first conductor 11 and the second conductor 12 and ground, such as a chassis of a vehicle 1 in which the electric system 2 is located. The test load or signal may be applied with a certain time interval. It may e.g. be a current pulse of a predetermined duration.

S2: While applying the test load or test signal, using the primary measuring unit 13, monitoring a first voltage between the first conductor 11 and ground, and a second voltage between the second conductor 12 and ground. Measurement data $V_{1-1}$, $V_{2-1}$ relating to the first and the second voltage, respectively, are thus obtained using the primary measuring unit 13. This may be carried out continuously or with a certain time interval while the test load is being applied.

S3: Based on measurement data relating to the first voltage and the second voltage from the primary measuring unit 13, determining an electric insulation of the electric system 2.

S4: Verifying the determined electric insulation based on measurement data $V_{1-2}$, $V_{2-2}$ relating to the first voltage and the second voltage, respectively, received from at least one secondary measuring unit 14 provided separately from the primary measuring unit 13.

The method may further comprise steps of determining that an electric insulation fault is present given that at least one insulation fault criterion is fulfilled, such as described above, and taking at least one action in response thereto, such as generating a signal and/or disconnecting a power supply of the electric system 2.

The method may be carried out in the control unit 16 of the insulation monitoring arrangement 10 shown in FIG. 2.

The control unit 16 may include a microprocessor, a microcontroller, a programmable digital signal processor or another programmable device. Thus, the control unit 16 comprises electronic circuits and connections (not shown) as well as processing circuitry (not shown) such that the control unit 16 can communicate with e.g. different parts of the bus 1 or with different control units of the bus 1 and/or of the electric system 2. The control unit 16 may comprise modules in either hardware or software, or partially in hardware or software, and communicate using known transmission buses such a CAN-bus and/or wireless communication capabilities. The processing circuitry may be a general purpose processor or a specific processor. The control unit 16 comprises a non-transitory memory for storing computer program code and data. Thus, the skilled person realizes that the control unit 16 may be embodied by many different constructions.

It is to be understood that the present invention is not limited to the embodiments described above and illustrated in the drawings; rather, the skilled person will recognize that many changes and modifications may be made within the scope of the appended claims.

The invention claimed is:

1. An electric insulation monitoring arrangement for monitoring electric insulation in an electric system comprising a first conductor and a second conductor, the electric insulation monitoring arrangement comprising:

an insulation monitoring device comprising a primary measuring unit configured to, when and while an initial test voltage is applied between at least one of the first and second conductors and ground, measure, as a function of time, a voltage response comprising a first voltage between the first conductor and the ground, and a second voltage between the second conductor and ground, the insulation monitoring device being configured to determine an electric insulation resistance of the electric system based on measurement data relating to the first voltage and the second voltage from the primary measuring unit, and at least one secondary measuring unit configured to:
measure, independently from the primary measuring unit, a set of voltage values of the first voltage with respect to the ground and a set of voltage values of the second voltage with respect to the ground, and
communicate to the insulation monitoring device the measured set of voltage values of the first voltage with respect to the ground and the measured set of voltage values of the second voltage with respect to the ground;

wherein the at least one secondary measuring unit is provided separately from the insulation monitoring device, and wherein the insulation monitoring device is configured to use the measured set of voltage values of the first voltage with respect to the ground and the measured set of voltage values of the second voltage with respect to the ground received from the at least one secondary measuring unit to verify the determined electric insulation resistance, wherein the at least one secondary measuring unit is configured to monitor measure the set of voltage values of the first voltage and the set of voltage values of the second voltage at secondary measuring different positions that are physically separated from primary measuring positions at which the primary measuring unit is configured to measure the first voltage and the second voltage, wherein the insulation monitoring device is configured to determine that an electric insulation fault is present between the at least one of the first and second conductors and the ground given that at least one insulation fault criterion fulfilled if one of the primary and secondary measuring units measures a voltage drop that corresponds to a calculated insulation resistance being below a predetermined threshold value being a safe electric insulation level, and wherein the insulation monitoring device is configured to, in response to the determination of the electric insulation fault, generate a signal and/or disconnect a power supply of the electric system.

2. The electric insulation monitoring arrangement according to claim 1, wherein the at least one secondary measuring unit is controlled independently from the insulation monitoring device.

3. The electric insulation monitoring arrangement according to claim 1, further comprising a communication interface for communicating measurement data from the at least one secondary measuring unit to the insulation monitoring device.

4. The electric insulation monitoring arrangement according to claim 1, comprising at least two separate secondary measuring units, wherein the insulation monitoring device is configured to use measurement data relating to the first voltage and the second voltage received from both of the at least two secondary measuring units for verifying the determined electric insulation.

5. A method for monitoring electric insulation in an electric system comprising a first conductor and a second conductor, the method comprising:

applying an initial test load between at least one of the first conductor and the second conductor and ground;

while applying the test load, using a primary measuring unit to measure, as a function of time, a voltage response comprising a first voltage between the first conductor and the ground, and a second voltage between the second conductor and the ground;

based on measurement data relating to the first voltage and the second voltage from the primary measuring unit, determining an electric insulation resistance of the electric system;

receiving from at least one secondary measuring unit a set of voltage values of the first voltage with respect to the ground and a set of voltage values of the second voltage with respect to the ground obtained by the at least one secondary measuring unit independently from the primary measuring unit;

verifying the determined electric insulation based on measurement data relating to the first voltage and the second voltage received from the at least one secondary measuring unit provided separately from the primary measuring unit, wherein the at least one secondary measuring unit is configured to measure the set of voltage values of the first voltage and the set of voltage values of the second voltage at secondary measuring a different positions that are physically separated from primary measuring positions at which the primary measuring unit is configured to measure the first voltage and the second voltage;

determining that an electric insulation fault is present between the at least one of the first and second conductors and the ground if one of the primary and secondary measuring units measures a voltage drop that corresponds to a calculated insulation resistance being below a predetermined threshold value being a safe electric insulation level; and in response to the determination of the electric insulation fault, generating a signal and/or disconnecting a power supply of the electric system.

6. The electric insulation monitoring arrangement according to claim 1, wherein the calculated insulation resistance is a resistance determined from the measurement data acquired by at least one of the primary measuring unit and the at least one secondary measuring unit.

7. The method according to claim 5, wherein the calculated insulation resistance is a resistance determined from the measurement data acquired by at least one of the primary measuring unit and the at least one secondary measuring unit.

8. A non-transitory computer readable medium carrying a computer program comprising program code for causing an insulation monitoring device, when said computer program is run on a control unit of the insulation monitoring device, perform a method, comprising:

applying an initial test load between at least one of the first conductor and the second conductor and ground;

while applying the test load, using a primary measuring unit to measure, as a function of time, a voltage response comprising a first voltage between the first conductor and the ground, and a second voltage between the second conductor and the ground;

based on measurement data relating to the first voltage and the second voltage from the primary measuring unit, determining an electric insulation resistance of the electric system;

receiving from at least one secondary measuring unit a set of voltage values of the first voltage with respect to the ground and a set of voltage values of the second voltage with respect to the ground obtained by the at least one secondary measuring unit independently from the primary measuring unit;

verifying the determined electric insulation based on measurement data relating to the first voltage and the second voltage received from the at least one secondary measuring unit provided separately from the primary measuring unit, wherein the at least one secondary measuring unit is configured to measure the set of voltage values of the first voltage and the set of voltage values of the second voltage at secondary measuring-positions that are physically separated from primary measuring positions at which the primary measuring unit is configured to measure the first voltage and the second voltage;

determining that an electric insulation fault is present between the at least one of the first and second conductors and the ground if one of the primary and secondary measuring units measures a voltage drop that corresponds to a calculated insulation resistance being below a predetermined threshold value being a safe electric insulation level; and in response to the determination of the electric insulation fault, generating a signal and/or disconnecting a power supply of the electric system.

9. A vehicle comprising an electric system and at least one electric insulation monitoring arrangement for monitoring electric insulation in the electric system, the electric insulation monitoring arrangement comprising:
- an insulation monitoring device comprising a primary measuring unit configured to, when and while an initial test voltage is applied between at least one of the first and second conductors and ground, measure, as a function of time, a voltage response comprising a first voltage between the first conductor and the ground, and a second voltage between the second conductor and ground, the insulation monitoring device being configured to determine an electric insulation resistance of the electric system based on measurement data relating to the first voltage and the second voltage from the primary measuring unit, and
- at least one secondary measuring unit configured to:
  - measure, independently from the primary measuring unit, a set of voltage values of the first voltage with respect to the ground and a set of voltage values of the second voltage with respect to the ground, and
  - communicate to the insulation monitoring device the measured set of voltage values of the first voltage with respect to the ground and the measured set of voltage values of the second voltage with respect to the ground;
  - wherein the at least one secondary measuring unit is provided separately from the insulation monitoring device, and wherein the insulation monitoring device is configured to use the measured set of voltage values of the first voltage with respect to the ground and the measured set of voltage values of the second voltage with respect to the ground received from the at least one secondary measuring unit to verify the determined electric insulation resistance, wherein the at least one secondary measuring unit is configured to measure the set of voltage values of the first voltage and the set of voltage values of the second voltage at secondary measuring positions that are physically separated from primary measuring positions at which the primary measuring unit is configured to measure the first voltage and the second voltage, wherein the insulation monitoring device is configured to determine that an electric insulation fault is present between the at least one of the first and second conductors and the ground if one of the primary and secondary measuring units measures a voltage drop that corresponds to a calculated insulation resistance being below a predetermined threshold value being a safe electric insulation level, and wherein the insulation monitoring device is configured to, in response to the determination of the electric insulation fault, generate a signal and/or disconnect a power supply of the electric system.

* * * * *